June 16, 1959    R. C. EBERSOLD    2,890,715
MULTI-PRESSURE RELIEF VALVE
Filed Aug. 26, 1955

INVENTOR.
ROBERT C. EBERSOLD
BY Hudson, Boughton,
Williams, David & Hoffmann
ATTORNEYS United States Patent Office 2,890,715
Patented June 16, 1959

2,890,715
MULTI-PRESSURE RELIEF VALVE

Robert C. Ebersold, Chagrin Falls, Ohio, assignor to The Warner & Swasey Company, Cleveland, Ohio, a corporation of Ohio Application August 26, 1955, Serial No. 530,781

2 Claims. (Cl. 137—494)

This invention relates to a pressure relief valve.

An object of the invention is to provide a pressure relief valve which selectively can be caused to function at any one of a plurality of different predetermined pressures to relieve the pressures in a pressure fluid circuit in excess over said predetermined pressures.

A further object is to provide a pressure relief valve which regulates the pressure in a pressure fluid circuit having a substantially constant pressure fluid supply source so that said circuit can be selectively employed to operate a single pressure fluid actuated device at a plurality of different predetermined pressures or a plurality of independent pressure fluid actuated devices each operating at a different predetermined pressure.

A further object is to provide a pressure relief valve as referred to in the preceding objects and which valve is compact, of simple construction and has its operating parts arranged in alignment one with the other and wherein a single movable valve body member or pressure control valve selectively can be caused to regulate the pressure in the pressure fluid circuit to maintain therein any one of a plurality of different predetermined pressures.

Figure 1:
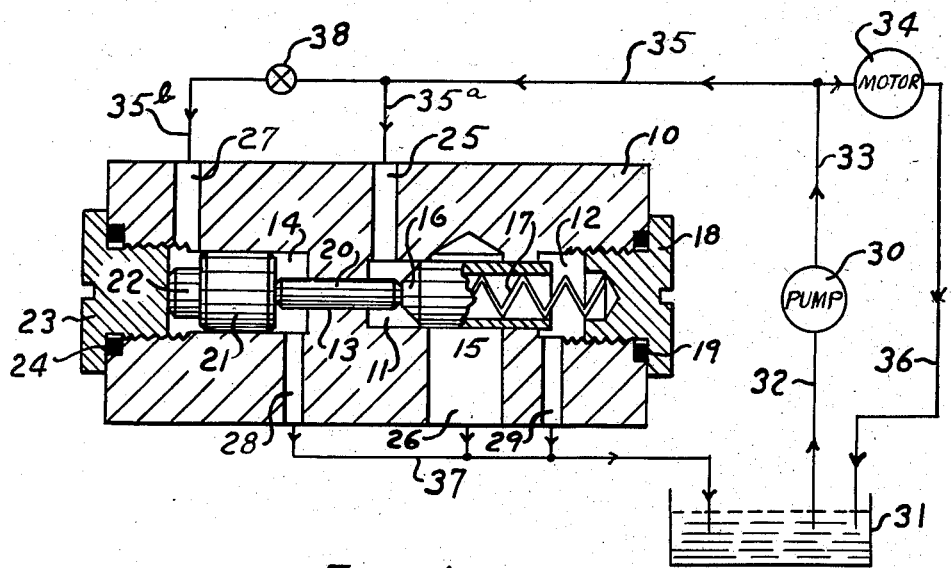
Figure 2:
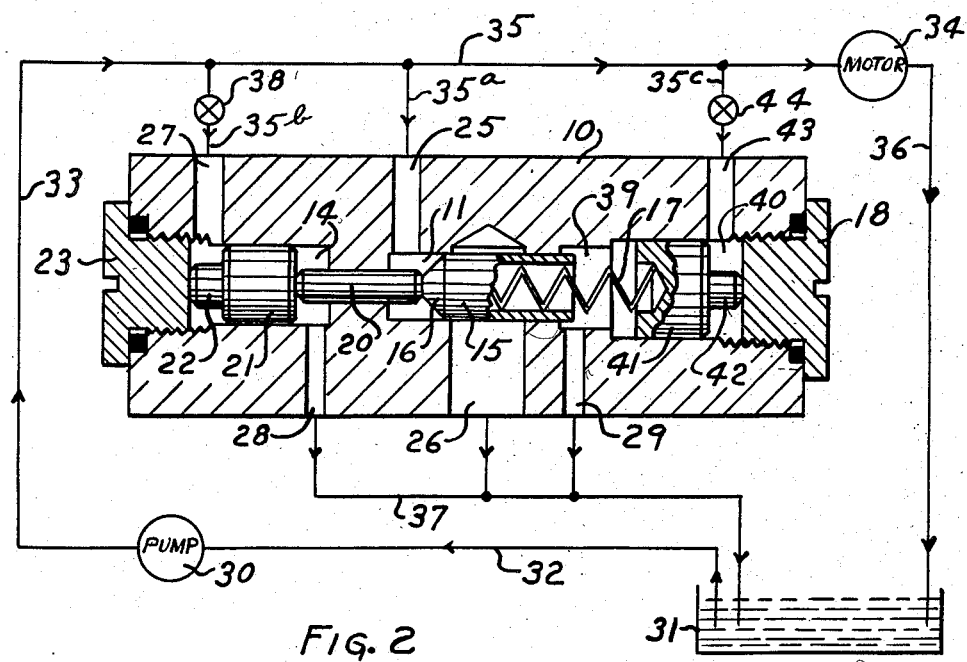

Further and additional objects and advantages not hereinbefore referred to will become apparent hereinafter during the detailed description of several embodiments of the invention which is to follow and which embodiments are illustrated in the accompanying drawing forming part of this specification and wherein:

Fig. 1 is a sectional view through a pressure relief valve embodying the invention with the pressure fluid circuit which it controls shown schematically and which valve functions to maintain selectively either a predetermined high pressure or a predetermined low pressure in the circuit, and Fig. 2 is a view similar to Fig. 1 but illustrating another embodiment of the invention and wherein the pressure relief valve functions to selectively maintain any one of four different predetermined pressures in the circuit.

A pressure relief valve embodying the invention can be advantageously employed in a pressure fluid circuit having a single constant source of pressure fluid and which circuit is connected to a single pressure fluid actuated device functioning at different predetermined pressures or to a plurality of separate pressure fluid actuated devices each requiring a different predetermined pressure for its operation.

The pressure relief valve of Fig. 1 embodying the present invention is shown and described in my copending application Serial No. 398,759, filed December 17, 1953, now Patent No. 2,781,879, wherein the valve is utilized to selectively maintain two different predetermined pressures in the circuit, with one of said pressures used to actuate hydraulic clutches and the other to actuate a brake mechanism in a machine tool.

Referring first to Fig. 1, the pressure relief valve shown therein comprises a housing 10 provided with a bore or valve chamber 11 aligned and communicating with a counterbore or chamber 12. The valve chamber 11 also aligns and communicates with a reduced diameter bore 13 which in turn aligns and communicates with a second counterbore or third chamber 14. The bore or valve chamber 11 contains a cylindrical valve body member or pressure control valve 15 slidable therein and which member or valve at its end adjacent to the reduced diameter bore 13 has a frustoconical head 16. The control valve 15 is hollow for a portion of its length and receives therein one end of a compression spring 17, the opposite end of which extends into the counterbore or chamber 12 and seats in and abuts against a flanged threaded cap 18 screwed into the threaded outer end of the counterbore or chamber 12. The tension of the spring 17 may be adjusted by varying the position of the cap 18. A sealing gasket 19 is interposed between the housing 10 and the flange of the cap 18.

Slidable in the reduced diameter bore 13 is a movement transmitting pin 20, one end of which extends into the valve chamber 11 and engages the conical head or end 16 of the control valve 15 while the other end of said pin extends into the third chamber 14. The chamber 14 constitutes a cylinder in which a piston 21 is slidable with said piston having one of its end contacting the movement transmitting pin 20 while its opposite end is provided with a cylindrical nipple 22 of predetermined reduced diameter. The chamber 14 adjacent its outer end is threaded and has screwed therein a flanged cap 23, the inner end of which normally contacts the end of the nipple 22 and acts as a stop to the movement of the piston 21 in one direction. A sealing gasket 24 is interposed between the housing 10 and the flange of the cap 23.

The housing 10 is provided with a supply or pressure passage 25 which communicates with the bore 11 at the end thereof wherein the conical head 16 of the valve 15 is located. The housing 10 is also provided with an exhaust passage 26 communicating with the chamber 11 intermediate its ends but normally closed by the pressure control valve 15.

The housing 10 is further provided with a second supply or pressure passage 27 communicating with the chamber 14 just inwardly of the cap 23. The housing 10, in addition, is provided with seepage or drain passages 28 and 29 communicating, respectively, with the chamber 14 inwardly of the piston 21 and with the chamber 12.

The pressure relief valve is shown connected in a pressure fluid circuit, in this instance a hydraulic circuit, and which includes a constant pressure supply pump 30 connected to a sump or reservoir 31 by line 32. The output side of the pump 30 is connected to a pressure line 33, which in turn, is connected to a pressure fluid actuated motor 34 and to the supply or pressure passages 25 and 27 of the valve housing 10 by a line 35 and branch lines 35a and 35b extending to said passages 25 and 27. The motor 34 is connected to the reservoir 31 by exhaust line 36.

In the illustrated construction the motor 34 represents a device that can be operated at either of two pressures but it will be understood that independent devices can be connected in the pressure circuit and which independent devices each will operate at a different pressure than the other. The two pressures may be designated as "high" or "low" pressure.

The exhaust passage 26 and the seepage or drain passages 28 and 29 in the valve housing 10 are connected to an exhaust line 37 which extends to the reservoir 31. In the supply line 35 intermediate the branch lines 35a and 35b or, if desired, in the pressure passage 27 of the housing 10 is an opened or closed selector valve 38 which when closed shuts off pressure fluid to the chamber 14 or when opened admits pressure fluid thereto and said valve 38 can be selectively actuated either manually or automatically by suitable mechanism, not shown, since it forms no part of the present invention.

The pressure relief valve of Fig. 1 is used to control the supply of a predetermined "high" pressure to the motor 34 in the following manner: The valve spring 17 is preloaded to a predetermined amount by screwing the cap 18 into the chamber 12 to a predetermined position so that said spring will exert a predetermined resistance to the movement of the control valve 15 in one direction, i.e., in the right hand direction as viewed in Fig. 1. The control valve 15 will thus be held in position to close the exhaust passage 26 in the absence of sufficient pressure on the head 16 of the valve 15 to overcome the action of the spring 17.

Now when the selector valve 38 is closed so that the piston 21 is not subject to line pressure, the pressure from the line 35 flowing through branch line 35a and passage 25 into valve chamber 11 acts on the projected area of the conical head 16 of the control valve 15 to exert pressure against the predetermined pressure action of the spring 17. When the hydraulic pressure acting on the head 16 of the control valve 15 equals the pressure of the spring 17 the valve 15 remains in a balanced position and closes the exhaust passage 26. However, should the hydraulic pressure acting on the head 16 of the valve 15 exceed the predetermined pressure of the spring 17 so as to overbalance the same then the control valve 15 moves toward the right under the action of the hydraulic pressure and opens exhaust passage 26 to relieve the excess hydraulic pressure in the chamber 11 and pressure line 35 until the balancing hydraulic pressure again obtains. Thus it will be seen whenever the hydraulic pressure in the supply line to the motor 34 and the pressure relief valve exceeds a predetermined pressure which balances the action of the spring 17, then the excess pressure is immediately relieved and the pressure reduced to the predetermined balancing pressure, wherefore the motor 34 will receive a substantially constant predetermined hydraulic pressure which in this instance may be designated as a high pressure.

When it is desired to operate the motor 34 at a substantially constant "low" pressure then the selector valve 38 is opened so that hydraulic pressure flows from the line 35 into the chamber 14 to act on the projected area of the piston 21 and nipple 22 and also through the pressure passage 25 into the valve chamber 11 to act on the projected area of the head 16 of the valve 15.

In this way the hydraulic pressures acting on the piston 21 and on the head 16 are additive and function jointly to overcome the action of the spring 17 when a predetermined low balancing pressure in the circuit is exceeded.

It will be seen that when the piston 21 is subjected to hydraulic pressure and is moved thereby toward the right in the chamber 14 its action is transmitted to the control valve 15 through the movement transmitting pin 20 and hence the pressure of the spring 17 is balanced at a lower pressure in the circuit so that a substantially constant "low" pressure will be supplied to the motor 34.

It will be seen that the cumulative effect of the hydraulic pressures acting on the piston 21 and the head 16 of the control valve 15 requires a relatively low pressure in the circuit to produce a balancing effect to the spring 17 so that the valve 15 remains closed. However, when pressure in the circuit exceeds such predetermined relatively low pressure then the effect of the spring 17 is overbalanced by the cumulative hydraulic pressures acting on the piston 21 and the head 16 and the valve 15 is moved to open the passage 26 to relieve said excess pressure. In this way a substantially constant predetermined "low" pressure is supplied to the motor 34. Inasmuch as the pump 30 is supplying a substantially constant high pressure to the circuit the control valve 15 will substantially constantly relieve the excess of the high pressure of the circuit to produce the predetermined "low" pressure.

The embodiment of the invention illustrated in Fig. 2 is such that the pressure of the spring 17 can be varied selectively by the pressure fluid to cause the relief valve to function so as to provide for pressures in the supply circuit intermediate the predetermined "high" and "low" pressures.

Insofar as the parts or features of the relief valve shown in Fig. 2 are identical to the corresponding parts or features of the relief valve of Fig. 1 the same reference numerals used in describing Fig. 1 are employed with respect to Fig. 2 and the previous description applies. The manner in which the valve of Fig. 2 differs in construction and function from the valve of Fig. 1 will now be explained.

In Fig. 2 the housing 10 is longer than the housing 10 of Fig. 1 and in place of the chamber 12 it is provided with a chamber having a reduced diameter portion 39 with which the seepage or drain passage 29 communicates and with a larger diameter outer portion 40, the outer end of which is closed by the flanged cap 18. The chamber portion 40 forms a cylinder in which slides a piston 41, the left hand end of which forms an abutment for the spring 17 while the right hand end thereof, as viewed in the drawing, is provided with a reduced nipple 42 which in the most right hand position of the piston 41 abuts the inner end of the cap 18. The chamber portion 40 communicates with a supply or pressure passage 43 in the housing 10 and said passage in turn is connected to the supply or pressure line 35 of the pressure fluid circuit by branch line 35c.

Arranged in the branch line 35c or in the pressure passage 43 of the housing 10 is a closed or opened selector valve 44 similar to the selector valve 38 and which may be selectively operated either manually or automatically. When the selector valve 44 is closed so that pressure fluid is not acting on the piston 41 then the pressure relief valve of Fig. 2 will function in the same way as does the pressure relief valve of Fig. 1 to produce in the circuit a predetermined "high" pressure or a predetermined "low" pressure depending upon whether or not the selector valve 38 is closed or opened.

Now assuming that the selector valve 38 is closed while the selector valve 44 is opened, the pressure relief valve will function to maintain in the circuit a predetermined "high" pressure, inasmuch as the pressure fluid acting on the piston 41 will move said piston to compress the spring 17 and thus increase its pressure load on the control valve 15 so that a higher pressure is required to move the valve 15 against the action of the spring.

Further assuming that the selector valves 38 and 44 are both opened, then it will be seen that the pressure relief valve functions to maintain a low pressure in the circuit but which is higher than the previously referred to low pressure. This is brought about since the load of the spring 17 on the control valve 15 is increased while the cumulative hydraulic pressures acting on the piston 21 and the head 16 of the control valve 15 act to overcome the increased spring pressure and thus the control valve 15 will be moved to pressure relieving position at a pressure which is relatively low but is higher than the former low pressure referred to in connection with Fig. 1. In other words, the pressure relief valve illustrated in Fig. 2 functions through the selective actuation of the selector valves 38 and 44 to maintain in the pressure circuit a predetermined maximum "high" pressure, a predetermined minimum "high" pressure, a predetermined maximum "low" pressure and a predetermined "low" pressure.

It will be understood that the pressure relief valves shown in Figs. 1 and 2 can be dimensionally varied as to the diameters of the chambers, pistons and control valve, as well as the preloading of the spring, so that said pressure relief valves can be produced to obtain certain predetermined pressures in accordance with the presssure requirements of the motor or motors or other pressure fluid actuated devices connected into the circuit.

Although several preferred embodiments of the invention have been illustrated and described herein it will be understood that the invention is susceptible of various modifications and adaptations within the scope of the appended claims.

Having thus described my invention, I claim:

1. A pressure relief valve operative selectively to relieve the pressures in a pressure fluid circuit which are in excess of a plurality of different predetermined pressures and comprising a housing body provided intermediate its ends with a bore and with a pair of counterbores of different diameters communicating with the opposite ends of said bore, a first pressure passage in said body communicating with one of said counterbores at the end thereof adjacent to said bore and constantly connected to the pressure fluid circuit, an exhaust passage in said body communicating with said one counterbore at a location spaced longitudinally thereof from said first pressure passage, a pressure control valve slidably fitted in said one counterbore and normally spaced from the end thereof that is adjacent to said bore and overlying and closing said exhaust passage, pressure means exerting a predetermined load on said control valve to maintain the same in its normal position wherein said exhaust passage is closed, said body being provided with a second pressure passage communicating with the other of said counterbores at the end thereof remote to said bore, a drain passage in said body communicating with said other counterbore at the end thereof adjacent to said bore, pressure fluid actuated means slidable in said other counterbore and provided on its end that is remote to said bore with abutment means engageable with the end of said other counterbore that is adjacent to said second pressure passage to maintain said pressure fluid actuated means spaced from said end, a pin slidable in said bore and extending into said counterbores and operatively interconnecting said control valve and said pressure fluid actuated means, said pressure means acting on said control valve normally causing the end of said control valve to engage said pin and the latter to engage said pressure fluid actuated means to maintain said abutment means in engagement with the end of said other counterbore, means for selectively connecting said second pressure passage with the pressure fluid circuit to exert a pressure load on said pressure fluid actuated means to produce through said pin a load on said control valve in opposition to the load of said pressure means thereon and having a cumulative effect with the pressure load continuously exerted on said control valve by the pressure in said first pressure passage and said one counterbore to move said control valve in a direction to place said first pressure passage in communication with said exhaust passage.

2. A pressure relief valve as defined in claim 1 and wherein said body is provided with a third counterbore in axial alignment with said bore and said pair of counterbores and of a greater diameter than both of said counterbores of said pair of counterbores, a third pressure passage in said body communicating with said third counterbore at the end thereof that is remote to said control valve, a piston slidable in said third counterbore and provided on its end that is adjacent to said third pressure passage with abutment means engageable with the end of said third counterbore to maintain said piston spaced from said end, said pressure means that acts on said control valve abutting said piston, and means for selectively connecting said third pressure passage with the pressure fluid circuit to exert a pressure load on said piston to increase the load of said pressure means on said control valve.

References Cited in the file of this patent

UNITED STATES PATENTS

| | | |
|---|---|---|
| 1,025,341 | Turner | May 7, 1912 |
| 1,406,026 | Jensenius | Feb. 7, 1922 |
| 1,879,020 | Balsiger | Sept. 27, 1932 |
| 1,916,767 | Mason | July 4, 1933 |
| 2,018,119 | Brouse | Oct. 22, 1935 |
| 2,159,979 | Parsons | May 30, 1939 |
| 2,287,936 | Hose | June 30, 1942 |
| 2,317,745 | Duckstein | Apr. 27, 1943 |
| 2,487,575 | Mercier | Nov. 8, 1949 |